US008108239B2

(12) United States Patent
Marlow et al.

(10) Patent No.: US 8,108,239 B2
(45) Date of Patent: Jan. 31, 2012

(54) SYSTEM AND METHOD FOR FACILITATING TRUSTED RECOMMENDATIONS

(75) Inventors: Cameron Marlow, New York, NY (US); Michael Irwin Mills, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1076 days.

(21) Appl. No.: 11/960,444

(22) Filed: Dec. 19, 2007

(65) Prior Publication Data

US 2009/0164263 A1 Jun. 25, 2009

(51) Int. Cl.
*G06Q 10/00* (2006.01)
(52) U.S. Cl. ........................................ 705/7.15; 705/7.14
(58) Field of Classification Search .................. None
See application file for complete search history.

(56) References Cited

U.S. PATENT DOCUMENTS

| 6,029,192 A * | 2/2000 | Hill et al. ................. 709/206 |
| 2006/0212305 A1* | 9/2006 | Bogle et al. ................. 705/1 |

* cited by examiner

*Primary Examiner* — Ryan Zeender
*Assistant Examiner* — Hajime Rojas
(74) *Attorney, Agent, or Firm* — James J. DeCarlo; Greenberg Traurig, LLP

(57) ABSTRACT

A system and method for matching candidates and placement providers through trusted recommenders without the need for the recommenders' direct engagement. The method includes receiving input from a provider regarding a recommender of candidates and from a candidate regarding a recommendation for that candidate by the recommender. A first trust score for the recommender is calculated, in accordance with a number of providers having a trust relationship with the recommender. A second trust score is calculated for the candidate with respect to a given provider, in accordance with the first trust score for the recommender, a trust relationship between the provider and the recommender, and a trust relationship between the candidate and the recommender. An ordered list of candidates is generated for the provider, in accordance with the second trust score.

22 Claims, 6 Drawing Sheets

| TRUSTED RECOMMENDER | TRUSTING PROVIDERS | RECOMMENDER'S TRUST SCORE | RECOMMENDER RANK | TRUSTING ACTORS |
|---|---|---|---|---|
| Prof. Abel | Acme Corp. | 1 | 5 | Al |
| Prof. Baker | Box Corp. | 1 | 5 | Al, Bob |
| Prof. Carr | Boz Corp., Dax Corp | 4 | 2 | Bob |
| Prof. Dean | Boz Corp., Caq Corp., Dax Corp | 5 | 1 | Al, Chuck, Don |
| Prof. Escher | | 0 | 7 | Chuck |
| Prof. Finn | Dax Corp. | 3 | 3 | Don |
| Prof. Grant | Dax Corp. | 3 | 3 | Don |

| PROVIDER | PROVIDER WEIGHT | TRUSTED RECOMMENDERS |
|---|---|---|
| Acme Corp. | 1 | Prof. Abel |
| Boz Corp. | 1 | Profs. Baker, Carr, Dean |
| Caq Corp. | 1 | Prof. Dean |
| Dax Corp. | 3 | Profs. Carr, Dean, Finn, Grant |

FIG. 6

| ACTOR | RECOMMENDED BY (score) |
|---|---|
| Al | Profs. Abel (1), Baker (1), Dean (5) |
| Bob | Profs. Baker (1), Carr (4) |
| Chuck | Profs. Dean (5), Escher(0) |
| Don | Profs. Dean (5), Finn (3), Grant (3) |

SYSTEM AND METHOD FOR FACILITATING TRUSTED RECOMMENDATIONS

FIELD OF THE DISCLOSURE

This disclosure relates to a placement system in which both prospective employers (placement providers) and prospective employees (actors) rely upon recommendations from trusted individuals.

BACKGROUND OF THE DISCLOSURE

Job placement can be a difficult process, and expensive in terms of human and computational resources. Prospective employers (providers) may have a large number of trusted sources for recruitment, and these sources may be able to recommend a large number of candidates (actors).

SUMMARY OF THE DISCLOSURE

The present disclosure provides a system and method for matching actors and providers through trusted recommenders without the need for the recommenders' direct engagement. A method according to the disclosure includes receiving input from a placement provider regarding a recommender of candidates and from a candidate regarding a recommendation for that candidate by the recommender. A first trust score for the recommender is calculated, in accordance with a number of placement providers having a trust relationship with the recommender. A second trust score is calculated for the candidate with respect to a given provider, in accordance with the first trust score for the recommender, a trust relationship between the provider and the recommender, and a trust relationship between the candidate and the recommender. An ordered list of candidates is generated for the given provider, in accordance with the second trust score.

In accordance with another aspect of the disclosure, a system includes a server configured to perform the steps described above. The placement provider and candidate may communicate separately with the server; in an embodiment, the recommender does not communicate with the server.

In accordance with a further aspect of the disclosure, a computer-readable medium includes instructions for performing a method with the above-described steps.

Additional features of the disclosure will be described hereinafter that form the subject of the claims of the disclosure. Those skilled in the art should appreciate that they can readily use the disclosed embodiments as a basis for designing or modifying other structures for carrying out the same purposes of the present disclosure and that such other structures do not depart from the spirit and scope of the disclosure in its broadest form.

BRIEF DESCRIPTION OF THE DRAWINGS

FIGS. 4-6, 7A and 7B show lists of trusted recommenders, providers and actors, including trust scores and rankings, in accordance with embodiments of the disclosure.

DETAILED DESCRIPTION

Figure 1:
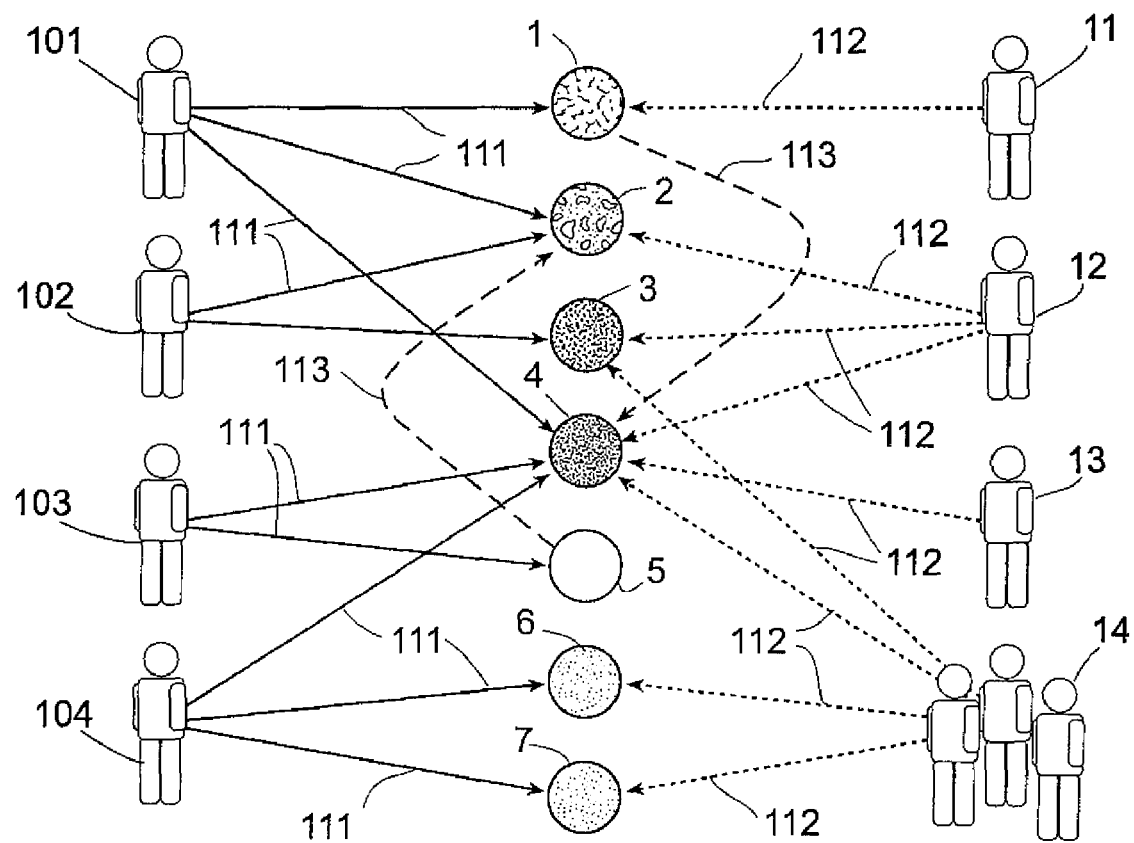
FIG. 1 is a schematic diagram of a network of trusted recommenders, providers and actors, showing the trust relationships among them.

A job placement system according to the present disclosure involves three groups of people, shown schematically in FIG. 1. Individual actors 101-104 are seeking positions with prospective employers 11-14 (job providers, or simply providers). The providers typically each have information concerning a large number of applicants, and accordingly wish to use an efficient method for identifying the best candidates. Rather than evaluate each actor individually, the providers choose to trust recommendations from one or more trusted individuals 1-7 (referred to herein as trusted recommenders). The actors 101-104 also choose to solicit recommendations from individuals whom they trust In this portion of the disclosure, purely by way of non-limiting example, the actors may be viewed as students seeking internships with the various providers, and soliciting recommendations from their professors. It will be appreciated, however, that the system and method disclosed herein applies to a wide variety of placement or recommendation or application situations.

As shown in FIG. 1, each provider forms a trust relationship (indicated by a dotted arrow 112) with one or more trusted recommenders, and each actor chooses to trust one or more of the recommenders (see solid arrows 111) to provide a recommendation on his behalf. In accordance with the disclosure, a record of trust relationships 112 may be built when a provider logs onto an online system which makes a query such as: "List five people whose recommendations you would trust for providing good candidates." Each provider then nominates recommenders that provider chooses to trust. Similarly, each actor is asked to nominate individuals who they believe would give them a recommendation.

Optionally, if a trusted recommender logs on to the system, the recommender may nominate one or more of his colleagues as an individual likely to recommend good candidates (shown schematically by dashed arrows 113). In the example shown in FIG. 1, recommender 1 is trusted by provider 11 and actor 101, and also trusts recommender 4.

Figure 2:
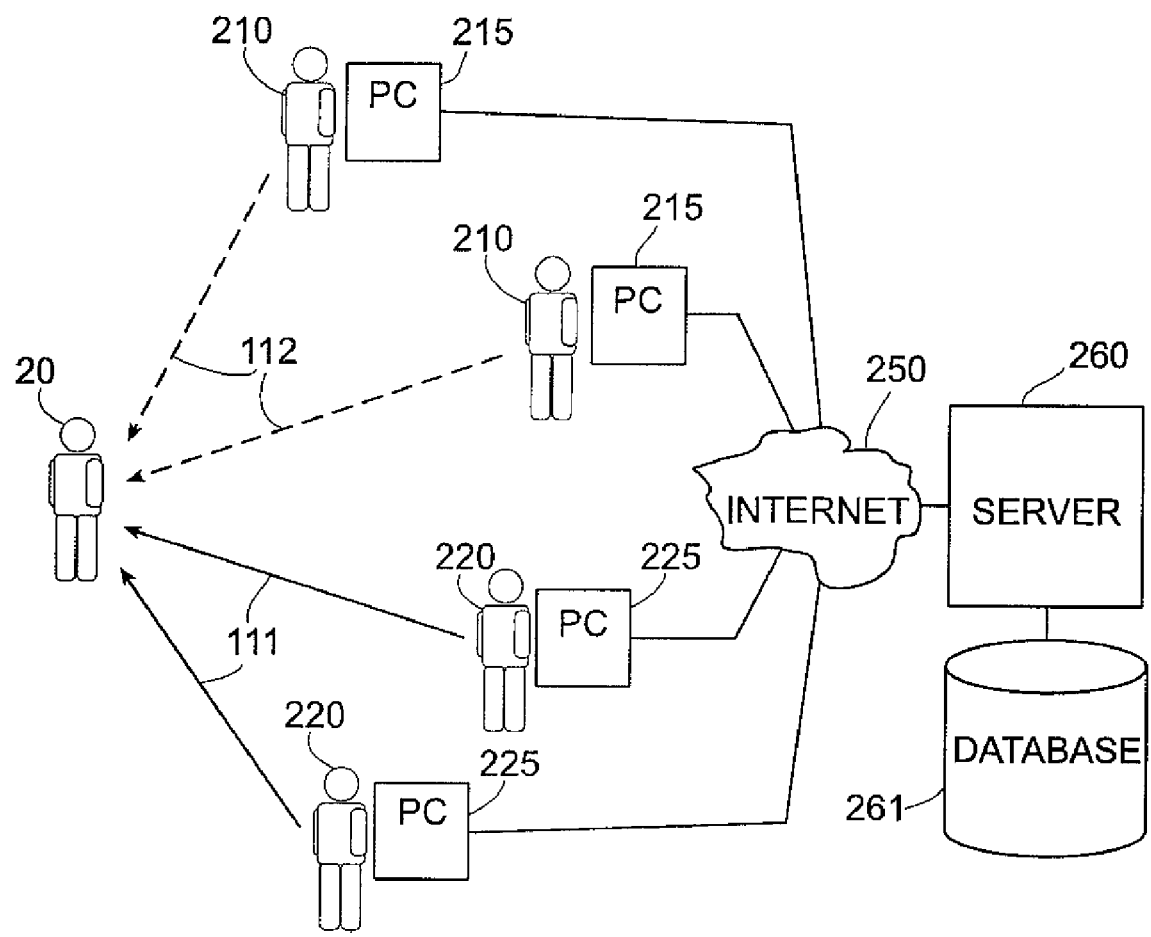
FIG. 2 is a schematic illustration of an automated system for facilitating placement placement, in accordance with an embodiment of the disclosure.

An automated system embodying the disclosure is shown schematically in FIG. 2. Providers 210 trust recommender 20 to provide names of good candidates (as indicated by arrow 112). At the same time, actors 220 trust recommender 20 to recommend them to providers (indicated by arrow 111). The providers and actors respectively use computing devices 215, 225 (personal computers, PDAs, or the like) to communicate with a server 260 over a network 250 such as the Internet. In accordance with a method described more fully below, the server receives input from actors and providers regarding the recommenders and their recommendations, calculates trust scores for each recommender and actor, and serves an ordered list of actors to each provider. Software implementing a method according to the disclosure is stored on a computer-readable medium or media, and machine readable so as to be executed on the server 260. The server communicates with a database 261 which maintains lists of provider, recommender and actor identification, provider and recommender trust scores and rankings, and other relevant information.

As can be seen in FIG. 2, trusted recommender 20 has a central role in the system and method according to the disclosure, even though recommender 20 is generally not herself engaged with the automated system. The trusted recommender has a hub-and-spoke relationship with the actors and providers through the trust relationships indicated by 111 and 112. It is noteworthy that, in this embodiment, trusted recommender 20 need not actually issue any recommendations; it is sufficient that he is recognized as a judge of the various actors' qualifications. In addition, it is not necessary for actors 220 and providers 210 to communicate directly; it is sufficient that both communicate with the system and respond to queries regarding who their trusted recommenders are.

Figure 3:
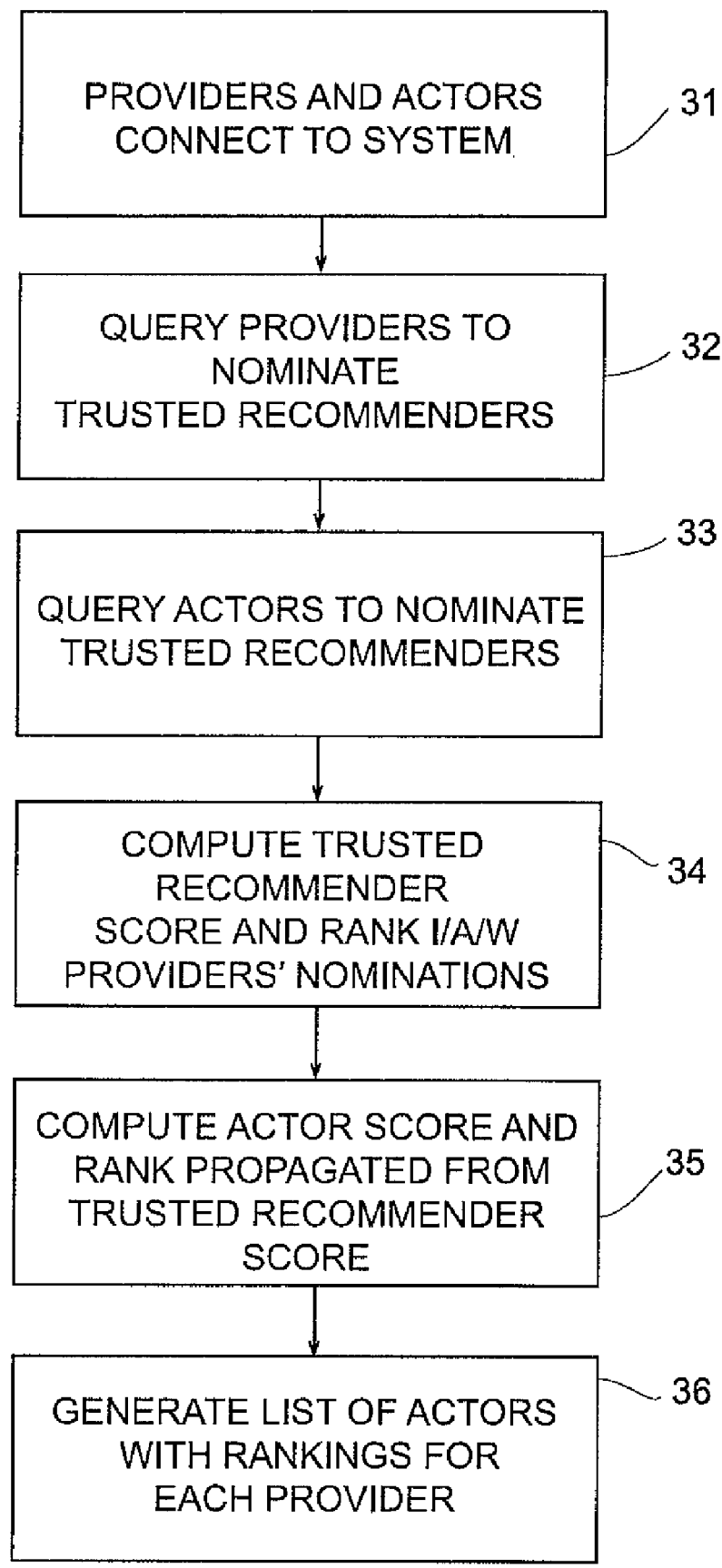
FIG. 3 is a flowchart illustrating steps in a placement method using providers' and actors' nominations of trusted recommenders, in accordance with an embodiment of the disclosure.

Steps in a method in accordance with the disclosure are shown in the flowchart of FIG. 3. The providers and actors connect to the system, e.g. by logging on from their respective computing devices over the Internet (step 31). In response to a query directed to the providers, each provider submits the name (and/or other identifying data) for one or more trusted recommenders (step 32). In response to a similar query directed to the actors, each actor nominates one or more trusted recommenders (step 33). A trust score and rank are then computed for each trusted recommender, based on the number of providers choosing to trust them (step 34). The score may also be based on the total number of jobs represented by a provider trusting a given individual. The trust relationship and trust score are then propagated to the actors who have a trust relationship with the recommenders (step 35). For any given provider, a ranked list of candidates is then produced (step 36), based on the likelihood of being trusted by the related recommenders.

Examples of trust scores and rankings for recommenders and actors, generated by the above-described process, are shown in FIGS. 4-6, 7A and 7B. Referring again to the example of FIG. 1, there are seven trusted recommenders 1-7, four providers 11-14, and four actors 101-104. FIG. 4 shows a list 40 of the recommenders trusted by the various providers. The trust score 41 for each recommender is the number of providers trusting that individual, weighted by the relative size or importance of the provider organization or the relative number of positions being provided. FIG. 5 shows a list 50 of providers and the recommenders trusted by each, with the relative provider weight 51. In the example of FIG. 1, provider 14 has three times as many jobs to offer as providers 11, 12 or 13, so that a trust relationship with provider 14 will contribute 3 units to the recommender's trust score rather than 1 (compare scores of recommenders 6 and 7 with recommender 1). The trust score may also be weighted according to other criteria; for example, how long a provider has had a trust relationship with a recommender, whether a recommender has received a nomination 113 from a colleague, etc. More generally, the trust score may be weighted according to a heuristic ranking of the number and importance of the placements associated with the recommender-provider relationship. List 40 also shows the ranking 42 of the recommenders, based on the trust score.

FIG. 6 shows a list 60 of the actors, and the trusted recommender(s) from whom each actor has secured a recommendation. The trust score for each recommender is propagated to the actor; these scores 61 are listed alongside each actor's name in FIG. 6.

Each provider has a trust relationship with particular recommenders (in general, a subset of the entire group of recommenders). For each provider (e.g. provider 14, as shown in list 70 in FIG. 7A), a list of actors is generated using the trust scores of the recommenders trusted by that provider. Since provider 14 has trust in recommenders 3, 4, 6 and 7, the trust relationships the actors have with those recommenders are analyzed. The trust scores for those recommenders are added together to yield a trust score for the candidate with respect to that provider. This score is then used to rank the actors (see FIG. 7A). Thus, since actor 104 can secure recommendations from trusted recommenders 4, 6 and 7 (see FIG. 1), and those recommenders are trusted by provider 14 and have trust scores of 5, 3 and 3 respectively, the score 71 for that actor is 5+3+3=11. Each actor is then assigned a ranking 72 based on the actor's trust score. Accordingly, with the trust relationships arranged as shown in FIG. 1, the candidate appearing most desirable to provider 14 is actor 104.

Figure 7A:
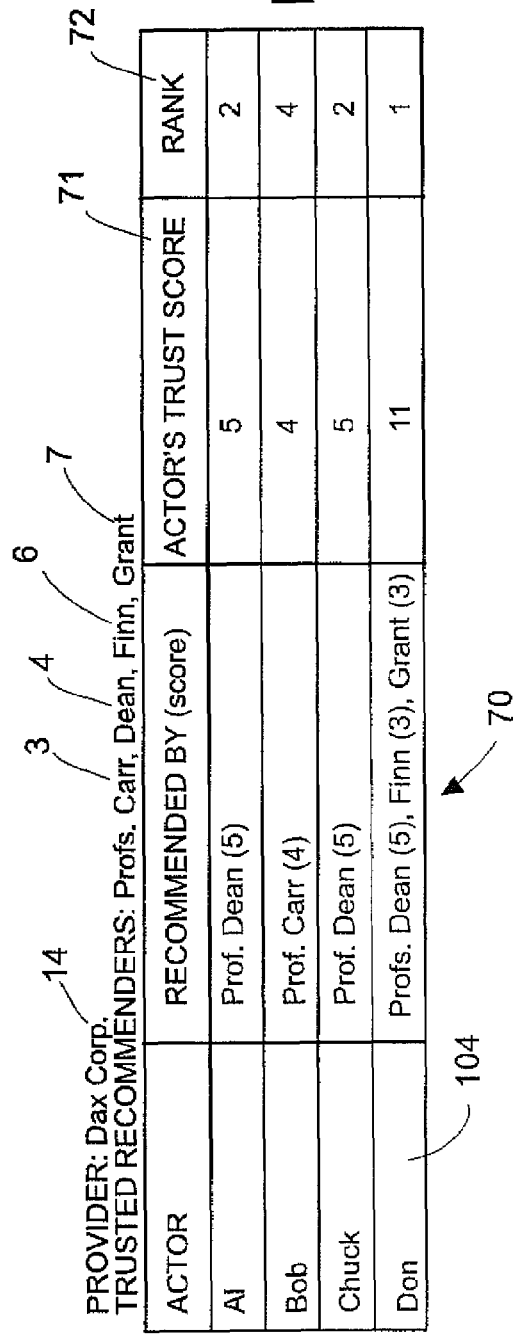
Figure 7B:
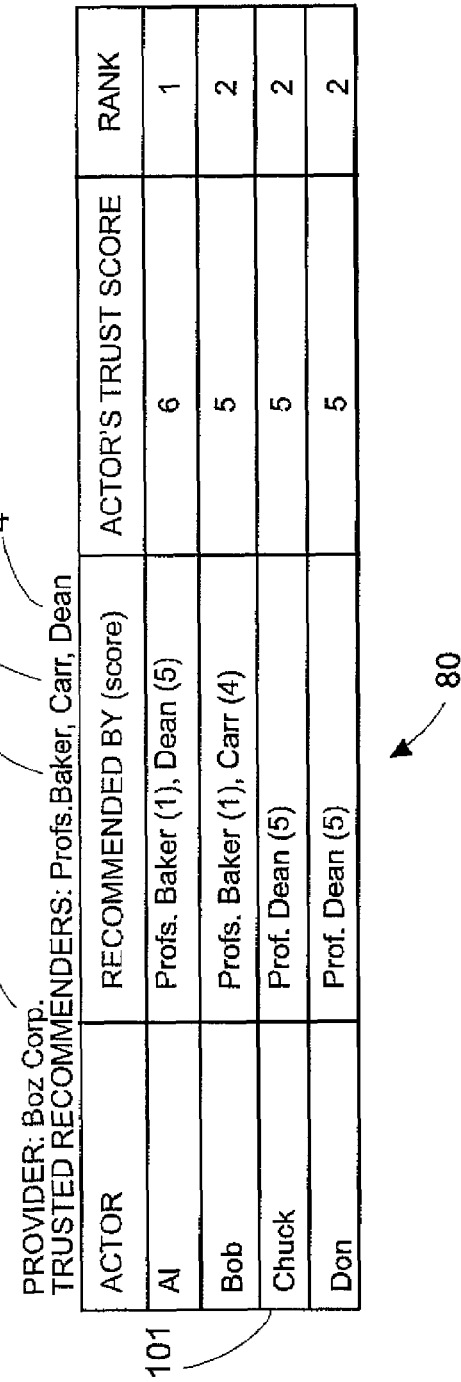

FIG. 7B shows a list 80 of actor trust scores and rankings for provider 12. Since provider 12 has trust relationships with recommenders different from provider 14, the trust scores for the actors are also different; the candidate appearing most desirable to provider 12 is actor 101. In general, a recommender has a single trust score, reflecting the trust relationships he has with the providers, while an actor has a different trust score for each provider, reflecting the different trust relationships each provider has with the various recommenders.

Actors may be ranked for each provider based on an individual ranking 72, as shown in FIGS. 7A and 7B. Alternatively, if one actor has a high ranking for multiple providers, it may be preferable to group together several of the highest-scoring actors, and then distribute those actors among the top of the lists for the providers. This distribution may be random, or may be in accordance with predefined criteria.

In the embodiment described above, the trusted recommender is not directly engaged with the system, and therefore there is no feedback from the recommender to verify an actor's statement that the actor has secured a recommendation. However, because of the social norms involved in the overall recommendation process, it is reasonable to expect an actor to be truthful as to whether a trusted recommender (e.g. a professor or mentor) would actually recommend him. Students who misrepresent their recommendations would suffer adverse consequences. In another embodiment, security may be added to the process by tracking the history of the relationship between providers and recommenders, and the performance of the recommended actor. A recommender may be assigned a score reflecting the outcome of the recommendation; over time this score would signify the likelihood that the recommender can provide satisfactory recommendations. A negative outcome would adversely affect the future relationship between a recommender and the provider.

This invention provides a way of introducing candidates through a trusted environment without the need for recommenders to engage with the system. Since the incentive to participate comes from providers and actors, and not the recommenders, the invention greatly reduces the amount of work necessary to evaluate candidates.

It will be appreciated that a system and method according to the present disclosure may be applied to any situation where an individual or organization is seeking placement in (or association with) another, and where that individual's or organization's credentials require some evaluation. Additional non-limiting examples include a student applying to college; a contractor seeking new assignments; an individual applying for membership in a professional or trade society; or an organization applying for membership in a business association.

It also will be appreciated that the data structure representing the trust relationships may be viewed as an abstract graph, and that various algorithms may be used to arrive at the rankings 72 which are then used to match candidates with providers.

For the purposes of this disclosure a server is software, hardware, or firmware (or combinations thereof) capable of performing the receiving, processing and serving steps in the above-described method. A server may be a single server or a group of servers acting together. The server may or may not be embodied as one system or as multiple parts of a distributed system, or as sub-systems of one or the other engines or systems described herein. A number of program modules and data files may be stored on a computer readable medium of the server They may include an operating system suitable for controlling the operation of a networked server computer, such as the WINDOWS XP or WINDOWS 2000 operating systems from MICROSOFT CORPORATION.

For the purposes of this disclosure a computer readable medium stores computer data in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In an embodiment the network 250 may be an intranet (a private version of the Internet). An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

For the purposes of this disclosure a computing device 215 or 225 includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, the lists shown in FIGS. 4-6, 7A and 7B may be formatted in a variety of ways to convey the desired information.

Numerous other changes may be made that will readily suggest themselves to those skilled in the art and which are encompassed in the spirit of the invention disclosed and as defined in the appended claims.

We claim:

1. A method comprising:

receiving, using a computing device, input from each placement provider of a plurality of placement providers regarding a recommender, the input indicating the respective placement provider trusts the recommender;

receiving, using the computing device, input from each candidate of a plurality of candidates, the input indicating the recommender recommends the respective candidate;

calculating, using the computing device, a first trust score for the recommender in accordance with a number of the plurality of placement providers having a trust relationship with the recommender, such that the first trust score for the recommender is weighted according to a heuristic ranking of a number and importance of placements offered by each placement provider of the plurality of placement providers;

calculating, using the computing device, a respective second trust score for each candidate of the plurality of candidates with respect to one provider of the plurality of providers in accordance with the first trust score for the recommender, a trust relationship between said one provider of the plurality of providers and the recommender, and a respective trust relationship between the respective candidate and the recommender; and making available, using the computing device, to said provider an ordered list of each candidate of the plurality of candidates in accordance with each respective candidates' respective second trust score.

2. The method according to of claim 1, further comprising calculating, using the computing device, a plurality of second trust scores for each candidate of the plurality of candidates, each respective second trust score corresponding to a respective one provider of the plurality of providers.

3. The method of claim 1, further comprising maintaining, using the computing device, a database including identifying information regarding the plurality of providers, a plurality of recommenders and the plurality of candidates, a respective first trust score for each recommender of the plurality of recommenders, and a respective second trust score for each candidate of the plurality of candidates with respect to each provider of the plurality of providers.

4. The method of claim 1, further comprising receiving, using the computing device, input from the recommender indicating the recommender recommends a second recommender.

5. The method of claim 1, wherein the respective second trust score for each candidate of the plurality of candidates is calculated by adding the first trust scores of each recommender of a plurality of 1 recommenders having a trust relationship with said one provider of the plurality of providers and having a trust relationship with the respective candidate.

6. The method of claim 1, further comprising assigning, using the computing device, to the ordered list for said one provider of the plurality of providers one candidate of the plurality of candidates selected according to predefined criteria.

7. The method of claim 1, further comprising tracking, using the computing device, performance of recommended candidates over time and adjusting the first trust score in accordance therewith.

8. A computing device comprising:
a processor;
a storage medium for tangibly storing thereon program logic for execution by the processor, the program logic comprising:
receiving logic executed by the processor for receiving input from each placement provider of a plurality of placement providers regarding a recommender, the input indicating the respective placement provider trusts the recommender and receive input from each candidate of a plurality of candidates, the input indicating the recommender recommends the candidate;
processing logic executed by the processor for calculating a first trust score for the recommender in accordance with a number of placement providers having a trust relationship with the recommender and calculating a respective second trust score for each candidate of the plurality of candidates with respect to one provider of the plurality of providers in accordance with the first trust score for the recommender, a trust relationship between said one provider of the plurality of providers and the recommender, and a respective trust relationship between the respective candidate and the recommender, such that the first trust score for the recommender is weighted according to a heuristic ranking of a number and importance of placements offered by each placement provider of the plurality of placement providers; and
serving logic executed by the processor for serving to said provider an ordered list of each candidate of the plurality of candidates in accordance with each respective candidates' respective second trust score.

9. The system computing device of claim 8, wherein the processing logic is further configured to calculate a plurality of second trust scores for each candidate of the plurality of candidates, each respective second trust score corresponding to a respective one provider of the plurality of providers.

10. The computing device of claim 8, further comprising a database connected to the processor for storing identifying information regarding the plurality of providers, a plurality of recommenders and the plurality of candidates, a respective first trust score for each recommender of the plurality of recommenders, and a respective second trust score for each candidate of the plurality of candidates with respect to each provider of the plurality of providers.

11. The computing device of claim 8, wherein the receiving logic is further configured to receive input from the recommender indicating the recommender recommends a second recommender.

12. The computing device of claim 8, wherein the processing logic is further configured to calculate the second trust score for each candidate of the plurality of candidates by adding the first trust scores of each recommender of a plurality of 1 recommenders having a trust relationship with said one provider of the plurality of providers and having a trust relationship with the respective candidate.

13. The computing device of claim 8, wherein the processing logic is further configured to assign to the ordered list for said one provider of the plurality of providers one candidate of the plurality of candidates selected according to predefined criteria.

14. The computing device of claim 8, wherein the receiving logic is further configured to receive input tracking performance of recommended candidates over time, and to adjust the first trust score in accordance therewith.

15. The computing device of claim 8, wherein the placement provider and the candidate communicate separately with the computing device over a network.

16. The computing device of claim 8, wherein the recommender does not communicate with the computing device.

17. A non-transitory computer-readable storage medium for tangibly storing thereon computer readable instructions for a method comprising:
receiving input from each placement provider of a plurality of placement providers regarding a recommender, the input indicating the respective placement provider trusts the recommender;
receiving input from each candidate of a plurality of candidates, the input indicating the recommender recommends the respective candidate;
calculating a first trust score for the recommender in accordance with a number of the plurality of placement providers having a trust relationship with the recommender, such that the first trust score for the recommender is weighted according to a heuristic ranking of a number and importance of placements offered by each placement provider of the plurality of placement providers;
calculating a respective second trust score for each candidate of the plurality of candidates with respect to one provider of the plurality of providers in accordance with the first trust score for the recommender, a trust relationship between said one provider of the plurality of providers and the recommender, and a respective trust relationship between the respective candidate and the recommender; and
making available to said provider an ordered list of each candidate of the plurality of candidates in accordance with each respective candidates' respective second trust score.

18. The non-transitory computer-readable storage medium of claim 17, wherein the method further comprises calculating a plurality of second trust scores for each candidate of the plurality of candidates, each respective second trust score corresponding to a respective one provider of the plurality of providers.

19. The non-transitory computer-readable storage medium of claim 17, wherein the method further comprises maintaining a database comprising stored identifying information regarding the plurality of providers, a plurality of recommenders and the plurality of candidates, a respective first trust score for each recommender of the plurality of recommenders, and a respective second trust score for each candidate of the plurality of candidates with respect to each provider of the plurality of providers.

20. The non-transitory computer-readable storage medium of claim 17, wherein the respective second trust score for each candidate of the plurality of candidates is calculated by adding the first trust scores of each recommender of a plurality of 1 recommenders having a trust relationship with said one provider of the plurality of providers and having a trust relationship with the respective candidate.

21. The non-transitory computer-readable storage medium of claim 17, wherein the method further comprises assigning to the ordered list for said one provider of the plurality of providers one candidate of the plurality of candidates selected according to predefined criteria.

22. The non-transitory computer-readable storage medium of claim 17, wherein the method further comprises tracking performance of recommended candidates over time and adjusting the first trust score in accordance therewith.

* * * * *